Patented June 8, 1926.

1,587,938

UNITED STATES PATENT OFFICE.

LEON LOUIS CAILLOUX AND LOUIS CAILLOUX, OF MONTREAL, QUEBEC, CANADA.

COMPOSITION FOR THE MAKING OF HYGIENIC, NONSLIPPING, AND NONSONOROUS FLOORINGS.

No Drawing.     Application filed November 28, 1924. Serial No. 752,755.

The present invention pertains to novel composition for making a flooring that will be hygienic, non-slipping, non-sonorous and water-proof in character.

The principal object of the invention is to provide a flooring of this character which, in order to possess the above mentioned properties, is made resilient by the use of cork. Silica is used to strengthen the composition but is introduced in such a manner that it does not impair the resiliency of the cork. This feature is to be contrasted with other compositions containing cork and silica wherein the latter imparts a stone-like consistency to the product. In the accomplishment of this particular object of the invention, talcum or an equivalent such as infusorial earth is added to provide the silica content.

As in other compositions of the same general character, a mixture of calcined magnesite and magnesium chloride is used as a mortar. An excess of magnesite generally remains, and in the finished product reacts with water which may be applied to the flooring whereupon the latter is changed in composition. Another object of the invention is to overcome this difficulty by the use of barium chloride solution which forms an unstable silicate of barium which in turn reacts with the free magnesium oxide to form the water-insoluble magnesium silicate.

In forming the composition, we bind cork particles with asbestos fibres and agglomerate the whole by the addition of a mortar composed of calcined magnesite and magnesium chloride. A fireproof composition is thus formed.

We add to the magnesium chloride a small quantity of barium chloride solution varying from 1/30 to 1/60 of one part. The barium chloride solution contains 35 parts of crystallized barium chloride in 100 parts of water. To the calcined magnesite we add a small quantity of talcum varying from 1/10 to 1/20 of one part.

The composition of talcum is ordinarily: silica, 63.52%; magnesia, 31.72%; evaporated water, 4.76%.

When the calcined magnesite and the magnesium chloride are mixed with the barium chloride and talcum the reaction starts at about 60° F. and increases constantly to about 300° F. During the increase in temperature, the silica of the talcum combines with the barium chloride to form an unstable silicate of barium which reacts with the excess of magnesium oxide and forms magnesium silicate which is insoluble. This makes the composition waterproof.

The proportions vary considerably with the desired softness, resistance or hardness of the flooring. To make a semi-soft flooring that can be easily spread with a trowel, the ingredients are used in the following proportion by volume: Asbestos, 1 part; calcined magnesite, 1 part; finely divided cork, 5 parts; magnesium chloride at 18° Bé. sufficient to make a plastic composition (about 1-1/3 part); talcum, 1/15 of 1 part; barium chloride solution (35 in 100) 1/45 of 1 part.

To make a very soft flooring we use: asbestos, 1/2 of 1 part; cork, 6 or 7 parts; barium chloride solution, 1/60 of 1 part; talcum, 1/20 of 1 part; calcined magnesite and magnesium chloride as above.

To make a hard flooring we use: asbestos, 1-1/2 parts; cork, 3 or 4 parts; talcum, 1/10 of 1 part; barium chloride solution, 1/30 of 1 part; calcined magnesite and magnesium chloride as above.

It is to be understood that saw dust may be used instead of cork as the equivalent thereof.

Having thus fully described the invention, what we claim as new and desire to protect by Letters Patent is:—

1. A new composition of matter comprising 1/2 to 1-1/2 parts asbestos fibres, 3 to 7 parts cork, 1 part calcined magnesite, 1-1/3 parts magnesium chloride at 18° Bé., 1/20 to 1/10 part talcum, and 1/60 to 1/30 part barium chloride solution containing 35 parts of crystallized barium chloride in 100 parts water.

2. A composition of matter comprising 1 part asbestos fibres, 5 parts finely divided cork, 1 part calcined magnesite, 1-1/3 parts magnesium chloride at 18° Bé., 1/15 of 1 part talcum, 1/45 of 1 part barium chloride solution containing 35 parts of crystallized barium chloride in 100 parts of water.

LEON LOUIS CAILLOUX.
LOUIS CAILLOUX.